United States Patent
Zhang et al.

(10) Patent No.: US 10,808,071 B2
(45) Date of Patent: Oct. 20, 2020

(54) DEGRADABLE SULFUR-CONTAINING HYPERBRANCHED EPOXY RESIN AND PREPARATION METHOD THEREOF

(71) Applicant: South Central University for Nationalities, Wuhan, Hubei (CN)

(72) Inventors: Daohong Zhang, Hubei (CN); Wenqiang Guo, Hubei (CN); Junheng Zhang, Hubei (CN); Juan Cheng, Hubei (CN); Aiqing Zhang, Hubei (CN); Jinlin Li, Hubei (CN)

(73) Assignee: South Central University for Nationalities, Wuhan (CN)

( * ) Notice: Subject to any disclaimer, the term of this patent is extended or adjusted under 35 U.S.C. 154(b) by 0 days.

(21) Appl. No.: 16/568,831

(22) Filed: Sep. 12, 2019

(65) Prior Publication Data
US 2020/0002463 A1 Jan. 2, 2020

Related U.S. Application Data

(63) Continuation of application No. PCT/CN2019/084160, filed on Apr. 24, 2019.

(30) Foreign Application Priority Data

Apr. 26, 2018 (CN) .......................... 2018 1 0387204

(51) Int. Cl.
| | |
|---|---|
| C08G 59/14 | (2006.01) |
| C08G 85/00 | (2006.01) |
| C08J 3/28 | (2006.01) |
| C08G 83/00 | (2006.01) |
| C08K 3/04 | (2006.01) |
| C08L 63/00 | (2006.01) |

(52) U.S. Cl.
CPC ..... *C08G 59/1483* (2013.01); *C08G 59/1477* (2013.01); *C08G 85/004* (2013.01); *C08J 3/28* (2013.01)

(58) Field of Classification Search
CPC .............. C08G 59/1483; C08G 85/004; C08G 59/1477; C08G 83/005; C08G 2230/00
See application file for complete search history.

(56) References Cited

U.S. PATENT DOCUMENTS

2007/0004902 A1  1/2007  Dreyer et al.
2010/0280151 A1* 11/2010  Nguyen ................. C08L 51/00
                                                        523/215

FOREIGN PATENT DOCUMENTS

| CN | 101475682 A | 7/2009 |
|---|---|---|
| CN | 101475685 A | 7/2009 |
| CN | 101591421 A | 12/2009 |
| CN | 101880374 A | 11/2010 |
| CN | 10-3030784 | * 4/2013 |
| CN | 103030784 A | 4/2013 |
| CN | 103145646 A | 6/2013 |
| CN | 10-5440267 | * 3/2016 |
| CN | 105440261 A | 3/2016 |
| CN | 10-6810674 | * 6/2017 |
| CN | 106810674 A | 6/2017 |
| CN | 10-87994726 | * 11/2018 |
| WO | WO 93/17060 A1 | 9/1993 |

OTHER PUBLICATIONS

U.S. Appl. No. 16/568,690, filed Sep. 12, 2019, Zhang, Daohong et al.
Jeannette M. Garcia et al., "Recyclable, Strong Thermosets and Organogels via Paraformaldehyde Condensation with Diamines," Science, vol. 344 (6185), pp. 732-735 (May 16, 2014).

\* cited by examiner

*Primary Examiner* — Robert D Harlan
(74) *Attorney, Agent, or Firm* — Mei & Mark LLP; Manni Li

(57) ABSTRACT

Degradable sulfur-containing hyperbranched epoxy resin and a preparation method thereof. The preparation method comprises initiating a reaction of a mercaptocyclotriazine compound and a binary olefin by ultraviolet light to prepare a mercapto hyperbranched polymer; then reacting with glycidyl methacrylate to obtain a degradable sulfur-containing hyperbranched epoxy resin of which the molecular weight is about 3,000-35,400 g/mol. After the degradable sulfur-containing hyperbranched epoxy resin is cured, a cyclotriazine structure can be completely degraded within 1.5 h in a phosphoric acid solution at the temperature of 80 DEG C, thus realizing the recycle of the epoxy resin. The invention is simple in process, low in reaction temperature, rapid in reaction and high in yield, the sulfur-containing structure lowers curing temperature and realizes rapid curing, and cyclotriazine structure has a degradation function, and is expected to be used in the fields of strengthening and toughening of the epoxy resins, solvent-free coatings, electronic packaging.

10 Claims, No Drawings

DEGRADABLE SULFUR-CONTAINING HYPERBRANCHED EPOXY RESIN AND PREPARATION METHOD THEREOF

CROSS-REFERENCE TO RELATED APPLICATIONS

The subject application is a continuation of PCT/CN2019/084160 filed on Apr. 24, 2019, which claims priority on Chinese application no. 201810387204.3 filed on Apr. 26, 2018. The contents and subject matters of both PCT application and Chinese priority application are incorporated herein by reference.

BACKGROUND OF THE INVENTION

Technical Field

The invention relates to the technical field of hyperbranched epoxy resin and a preparation method thereof, in particular to a degradable sulfur-containing hyperbranched epoxy resin and a preparation method thereof.

Description of Related Art

The synthesis of the sulfur-containing epoxy resin is mainly obtained by (1) a ring-opening or ring-closing reaction between a mercapto compound and epichlorohydrin or by (2) a reaction between an epoxy resin and a thiourea. The sulfur-containing epoxy resin prepared by the two methods has a hydrogen bond effect due to the hydroxyl group, so that the molecular chain of the sulfur-containing epoxy resin is easily entangled, resulting in a high viscosity of the product, which is usually required to be diluted by an organic solvent when applied; in addition, when applied to an acid anhydride curing system, it is easy to cause the acid anhydride to be opened and unstable, which eventually leads to a shortened storage period of the product. Moreover, the conventional process for preparing a sulfur-containing epoxy resin usually requires adding a large amount of organic solvents, and most processes require a water washing step after the reaction is completed, which causes certain pollution to the environment. An epoxy resin or a sulfur-containing epoxy resin having a low viscosity and less hydroxyl can be prepared by a hydrosilylation reaction, but due to high product cost, low efficiency, low yield, long reaction time, and high energy consumption, the organosilicone is hardly put into large-scale application.

The inventors of the application have prepared a sulfur-containing epoxy resin (ZL201310091452.0, ZL201210566173.0) by a reaction in a solution on the basis of a mercapto compound-olefin click reaction technique, which has high efficiency and high yield, and is the simplest method at that time. At present, epoxy resins and hyperbranched epoxy resins prepared by all the process technologies are of a three-dimensional network structure after being cured, and internal chemical bonds (carbon-carbon bonds and carbon-oxygen bonds) are difficult to be degraded, recycled and reused, and waste epoxy resin products are highly polluting to the environment and restricts the sustainable development technology of the epoxy resin industry. Therefore, the preparation technology of the degradable sulfur-containing hyperbranched epoxy resin with simple development process and short reaction time is the fundamental way to solve the problems existing in the field.

BRIEF SUMMARY OF THE INVENTION

Directed to the disadvantages in the prior art, an objective of the invention is to provide a novel degradable sulfur-containing hyperbranched epoxy resin of the following structural formula:

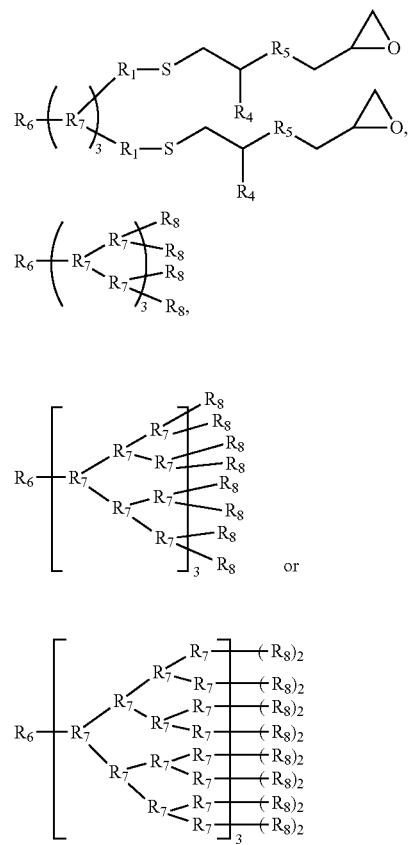

wherein the structure of $R_7$ is

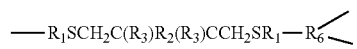

and the structure of $R_8$ is

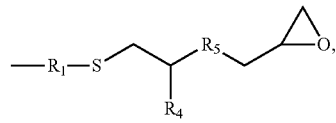

in the formula, $R_4$ is —H or —$CH_3$, and when $R_4$ is —H, $R_5$=—$OCH_2$—; when $R_4$ is —$CH_3$, $R_5$=—O—CO—; $R_1$ is —$C_6H_4(CH_2)_r$— or —$CH_2(CH_2)_k$—, where r=1, 2, 3 or 4, k=2, 3, 4 or 5, and a benzene ring in the —$C_6H_4(CH_2)_r$— is para-, meta- or ortho-substituent and is an amino substituted benzene ring structure; $R_3$ is —H or —$CH_3$, and when $R_3$ is —H, $R_2$=—$CH_2O(CH_2)_mOCH_2$— or —COO($CH_2)_m$OOC—, where m=2, 3, 4, 5 or 6; when $R_3$ is —$CH_3$, $R_2$=—COO($CH_2)_mOOC$—, where m=2, 3, 4, 5 or 6;

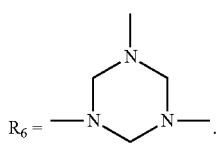

Another objective of the invention is to provide a preparation method of the degradable sulfur-containing hyperbranched epoxy resin of the foregoing structural formula, the reaction formula of its whole process is as follows:

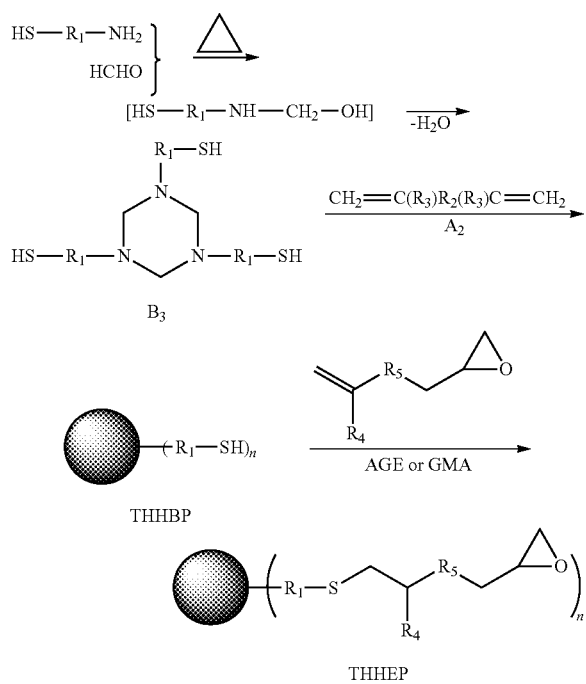

THHEP n = 6, 12, 24, or 48;

In order to further explain the reaction formula of its whole process, the specific steps of the preparation method are as follows:

(a) uniformly mixing a trimercapto cyclotriazine compound B3, a diolefin compound A2, a photoinitiator and an organic solvent, then reacting under 800-3,000 W ultraviolet light for 10-30 minutes at room temperature, and vacuum-extracting the organic solvent, thus obtaining a mercapto-terminated hyperbranched polymer,
wherein the structure of the trimercapto cyclotriazine compound B3 is

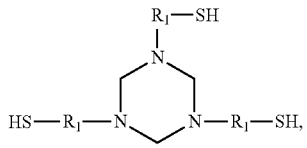

wherein $R_1$ is —$C_6H_4(CH_2)_r$— or —$CH_2(CH_2)_k$—, where r=1, 2, 3 or 4, k=2, 3, 4 or 5, and a benzene ring in the —$C_6H_4(CH_2)_r$— is para-, meta- or ortho-substituent and is an amino substituted benzene ring structure;
the structure of the diolefin compound A2 is $CH_2$=$C(R_3)$$R_2(R_3)C$=$CH_2$, wherein $R_3$ is —H or —$CH_3$, and when $R_3$ is —H, $R_2$=—$CH_2O(CH_2)_mOCH_2$— or —$COO(CH_2)_m$$OOC$—, where m=2, 3, 4, 5 or 6; when $R_3$ is —$CH_3$, $R_2$=—$COO(CH_2)_mOOC$—, where m=2, 3, 4, 5 or 6; and (b) uniformly mixing the mercapto-terminated hyperbranched polymer, an epoxy compound, a photoinitiator and an organic solvent, then carrying out a thiol-olefin click reaction under 800-3,000 W ultraviolet light for 10-30 minutes at room temperature, and vacuum-extracting the organic solvent and the excess epoxy compound to obtain the degradable sulfur-containing hyperbranched epoxy resin of which the molecular weight is about 3,000-35,400 g/mol.

The epoxy compound is glycidyl methacrylate (GMA) or allyl glycidyl ether (AGE).

The molar ratio of the trimercapto cyclotriazine compound B3 to the diolefin compound A2 in the step (a) is (1-1.5):1.

The molar ratio of the mercapto group in the mercapto-terminated hyperbranched polymer to glycidyl methacrylate (GMA) or allyl glycidyl ether (AGE) in the step (b) is 1:(1-2.5).

The photoinitiator in the step (a) is one or more than two of benzophenone, p-aminopropiophenone, and 2-methyl-1-[4-(methylthio)phenyl]-2-(4-morpholinyl)-1-propanone, and the photoinitiator in the step (a) is used in an amount of 0.5-3% by mass of the trimercapto cyclotriazine compound.

The photoinitiator in the step (b) is one or more than two of benzophenone, p-aminopropiophenone, and 2-methyl-1-[4-(methylthio)phenyl]-2-(4-morpholinyl)-1-propanone, and the photoinitiator in the step (b) is used in an amount of 0.5-3% by mass of the mercapto-terminated hyperbranched polymer.

The organic solvent in the step (a) is one or more than two of methanol, ethanol, tetrahydrofuran, dioxane, ethyl acetate and butyl acetate, and the organic solvent in the step (a) is used in an amount of 0.5-3.0 times the mass of the trimercapto cyclotriazine.

The organic solvent in the step (b) is one or two of methanol, ethanol, tetrahydrofuran, dioxane, ethyl acetate and butyl acetate, and the organic solvent in the step (b) is used in an amount of 0.5-3.0 times the mass of the mercapto-terminated hyperbranched polymer.

The degradable sulfur-containing hyperbranched epoxy resin prepared by the invention has the advantages of high reaction speed, high yield, low viscosity, and being degradable (the triazine ring can be degraded at a high temperature under an acidic condition), and is expected to be applied to the fields of environmentally friendly adhesives, environmentally friendly low-volatile coatings, low-volatility resins, strengthening and toughening of epoxy resins, etc.

Compared with the prior art, the technical solution of the invention has the following advantages and beneficial effects:

1. The invention introduces a cyclotriazine structure into the structure of a hyperbranched epoxy resin, which can realize a degradable function after curing of the epoxy resin, and an amino compound is produced after degradation of the cyclotriazine structure, and the amino compound can be used as a curing agent for epoxy resins and the raw material for the synthesis of the cyclotriazine to realize the recycling of the epoxy resin.

2. The degradable sulfur-containing hyperbranched epoxy resin of the invention has rapid degradation ability after being cured, and its degradation rate can reach 99.5% or above after the epoxy resin is placed in a phosphoric acid solution at 80° C. for 1.5 hours.

3. The degradable sulfur-containing hyperbranched epoxy resin of the invention has the advantages of a hyperbranched polymer, has strengthening and toughening function for ordinary epoxy resin, and thus is expected to be widely used in the field of strengthening and toughening of epoxy resins;

4. The sulfur-containing epoxy resin of the invention is prepared by a mercapto compound-olefin click ultraviolet photoreaction technique, and its preparation has the advantages of simple process, high yield, short reaction time, low pollution, and low cost.

5. The preparation method of the sulfur-containing hyperbranched epoxy resin of the invention has the characteristics of low raw material cost, low reaction temperature, high efficiency, high yield, short reaction time, and is a new energy-saving process suitable for industrial production of hyperbranched epoxy resin. The process does not need water washing etc., in the process of preparing the sulfur-containing hyperbranched epoxy resin, thus avoiding environmental pollution caused by the conventional water washing preparation of the sulfur-containing hyperbranched epoxy resin.

6. The degradable sulfur-containing hyperbranched epoxy resin of the invention has low viscosity, and is added to a bisphenol A epoxy resin (with a viscosity of 15600 cp) to significantly reduce its viscosity, thus functioning as a reactive diluent; moreover, the sulfur-containing structure can promote the curing of epoxy resin and improve the crosslinking density and heat resistance, and thus is expected to be applied to the fields of solvent-free coatings, electronic packaging etc.

DETAILED DESCRIPTION OF THE INVENTION

The invention is described in detail below with reference to specific embodiments, but these embodiments should not be construed as limiting the scope of the invention in any way.

The molecular weights of the products are determined by using GPC from British PL Company. The epoxy value is determined by the national standard hydrochloric acid acetone method, and the viscosity is measured by using a Brookfield viscometer at 25° C.

The cyclotriazine compounds B3 (i.e.,

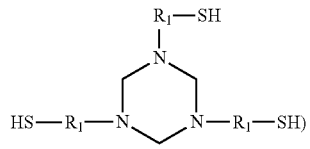

in the following embodiments are self-made by the inventors of the present application, and the specific preparation process is as follows:

Preparation of Compound B3:

The preparation of the mercapto cyclotriazine compound B3 is carried out based on the reaction principle of the reference (Science 2014, 344, (6185), 732-735), and its specific process steps are as follows: 0.1 mol of p-aminophenylmethyl mercaptan $H_2N-C_6H_4CH_2-SH$ ($R1=-C_6H_4CH_2-$), 0.20 mol of trioxymethylene, and 60 mL of distilled water are placed in a three-necked flask equipped with a condenser, a thermometer and a stirrer, and then stirred to react for 8 hours at a temperature of about 30° C., and the reaction is terminated. The water and unreacted formaldehyde are removed by rotary evaporation under the conditions of a vacuum degree of 2-3 mmHg and a temperature of about 60° C. to obtain a tris(4-mercaptomethylphenyl)cyclotriazine compound denoted as B3-01, with a yield of about 85%. The remaining B3 compounds can be obtained in a similar manner with yields between 70% and 90%. The corresponding compounds are denoted as B3-02 ($R_1=-C_6H_4(CH_2)_2-$), B3-03 ($R_1=-C_6H_4(CH_2)_4-$), B3-04 ($R_1=-CH_2(CH_2)_2-$), B3-05 ($R_1=-CH_2(CH_2)_3-$), and B3-06 ($R_1=-CH_2(CH_2)_5-$).

Embodiment 1

A degradable sulfur-containing hyperbranched epoxy resin prepared by the following method:

(a) 0.4 mol (181.2 g) of a trimercapto cyclotriazine B3-01, 0.3 mol (42.6 g) of a diolefin compound $CH_2=CHCH_2O(CH_2)_2OCH_2CH=CH_2$, 112.0 g of methanol and 1.12 g of a photoinitiator benzophenone are mixed uniformly and react under 800 W ultraviolet light for 30 minutes at room temperature, and the organic solvent methanol is then vacuum-extracted to obtain a mercapto-terminated hyperbranched polymer (THHBP-a6, containing 6 mol of mercapto group per mol of THHBP-a6), having a number average molecular weight of about 2,200 g/mol.

(b) 0.1 mol (220 g) of the mercapto-terminated hyperbranched polymer THHBP-a6, 0.63 mol of GMA, 110.0 g of tetrahydrofuran and 2.0 g of the photoinitiator benzophenone are uniformly mixed at room temperature and subjected to a thiol-olefin click reaction under 1,500 W ultraviolet light for 20 minutes at room temperature, and the organic solvent and excess GMA are then vacuum-extracted to obtain a degradable sulfur-containing hyperbranched epoxy resin having a number average molecular weight of about 3,000 g/mol, a 25° C. viscosity of 1,300 cp, an epoxy value of 0.20 mol/100 g, and a yield of 99.2%.

Embodiment 2

A degradable sulfur-containing hyperbranched epoxy resin prepared by the following method:

(a) 0.23 mol (113.9 g) of a cyclotriazine B3-02, 0.225 mol (38.25 g) of a diolefin compound $CH_2=CHCH_2O(CH_2)_4OCH_2CH=CH_2$, 152.0 g of ethanol and 4.5 g of a photoinitiator 2-methyl-1-[4-(methylthio)phenyl]-2-(4-morpholinyl)-1-propanone are mixed uniformly and react under 3000 W ultraviolet light for 10 minutes at room temperature, and the organic solvent ethanol is then vacuum-extracted to obtain a mercapto-terminated hyperbranched polymer (THHBP-48, containing 48 mol of mercapto group per mol of THHBP-48), having a number average molecular weight of about 30,000 g/mol.

(b) 0.01 mol (300 g) of the mercapto-terminated hyperbranched polymer THHBP-48, 1.05 mol (119.7 g) of AGE, 300 g of ethyl acetate and 3.0 g of a photoinitiator p-aminopropiophenone are uniformly mixed at room temperature and subjected to a thiol-olefin click reaction under 3,000 W ultraviolet light for 10 minutes at room temperature, and the organic solvent and excess AGE are then vacuum-extracted to obtain a degradable sulfur-containing hyperbranched epoxy resin having a number average molecular weight of about 35,400 g/mol, a 25° C. viscosity of 3,200 cp, an epoxy value of 0.13 mol/100 g, and a yield of 99.5%.

Embodiment 3

A degradable sulfur-containing hyperbranched epoxy resin prepared by the following method:

(a) 0.05 mol (28.95 g) of a cyclotriazine B3-03, 0.045 mol (7.65 g) of a diolefin compound $CH_2=CHCO$ O(CH$_2$)$_2$OOCCH=CH$_2$, 109.8 g of butyl acetate and 1.1 g of a photoinitiator p-aminopropiophenone are mixed uniformly and react under 2,000 W ultraviolet light for 15 minutes at room temperature, and the organic solvent butyl acetate is then vacuum-extracted to obtain a mercapto-terminated hyperbranched polymer (THHBP-a12, containing 12 mol of mercapto group per mol of THHBP-a12), having a number average molecular weight of about 7,300 g/mol.

(b) 0.01 mol (73 g) of the mercapto-terminated hyperbranched polymer THHBP-a12, 0.24 mol (27.4 g) of AGE, 219 g of ethyl acetate and 2.19 g of the photoinitiator p-aminopropiophenone are uniformly mixed at room temperature and subjected to a thiol-olefin click reaction under 2,000 W ultraviolet light for 15 minutes at room temperature, and the organic solvent and excess AGE are then vacuum-extracted to obtain a degradable sulfur-containing hyperbranched epoxy resin having a number average molecular weight of about 8,600 g/mol, a 25° C. viscosity of 1,900 cp, an epoxy value of 0.14 mol/100 g, and a yield of 99.3%.

Embodiment 4

A degradable sulfur-containing hyperbranched epoxy resin prepared by the following method:

(a) 0.11 mol (34.0 g) of a cyclotriazine B3-04, 0.105 mol (23.73 g) of a diolefin compound CH$_2$=CHCOO(CH$_2$)$_6$OOCCH=CH$_2$, 34.0 g of methanol and 0.68 g of a photoinitiator 2-methyl-1-[4-(methylthio)phenyl]-2-(4-morpholinyl)-1-propanone are mixed uniformly and react under 1,000 W ultraviolet light for 20 minutes at room temperature, and the organic solvent methanol is then vacuum-extracted to obtain a mercapto-terminated hyperbranched polymer (THHBP-24, containing 24 mol of mercapto group per mol of THHBP-24), having a number average molecular weight of about 11,500 g/mol.

(b) 0.01 mol (115 g) of the mercapto-terminated hyperbranched polymer THHBP-24, 0.36 mol (41.04 g) of AGE, 200 g of dioxane and 2.0 g of a photoinitiator p-aminopropiophenone are uniformly mixed at room temperature and subjected to a thiol-olefin click reaction under 2,000 W ultraviolet light for 12 minutes at room temperature, and the organic solvent and excess AGE are then vacuum-extracted to obtain a degradable sulfur-containing hyperbranched epoxy resin having a number average molecular weight of about 14,200 g/mol, a 25° C. viscosity of 2,100 cp, an epoxy value of 0.16 mol/100 g, and a yield of 99.6%.

Embodiment 5

A degradable sulfur-containing hyperbranched epoxy resin prepared by the following method:

(a) 0.10 mol (35.1 g) of a cyclotriazine B3-05, 0.09 mol (17.82 g) of a diolefin compound CH$_2$=C(CH$_3$)COO(CH$_2$)$_2$OOC(CH$_3$)C=CH$_2$, 17.5 g of dioxane and 0.3 g of a photoinitiator benzophenone are mixed uniformly and react under 2,000 W ultraviolet light for 10 minutes at room temperature, and the organic solvent is then vacuum-extracted to obtain a mercapto-terminated hyperbranched polymer (THHBP-b12, containing 12 mol of mercapto group per mol of THHBP-b12), having a number average molecular weight of about 5,200 g/mol.

(b) 0.01 mol (52 g) of the mercapto-terminated hyperbranched polymer THHBP-b12, 0.24 mol (34.08 g) of GMA, 100 g of dioxane and 1.0 g of a photoinitiator p-aminopropiophenone are uniformly mixed at room temperature and subjected to a thiol-olefin click reaction under 1,500 W ultraviolet light for 20 minutes at room temperature, and the organic solvent and excess GMA are then vacuum-extracted to obtain a degradable sulfur-containing hyperbranched epoxy resin having a number average molecular weight of about 6,900 g/mol, a 25° C. viscosity of 1,700 cp, an epoxy value of 0.17 mol/100 g, and a yield of 99.5%.

Embodiment 6

A degradable sulfur-containing hyperbranched epoxy resin prepared by the following method:

(a) 0.2 mol (87.0 g) of a cyclotriazine B3-06, 0.15 mol (33.9 g) of a diolefin compound CH$_2$=C(CH$_3$)COO(CH$_2$)$_4$OOC(CH$_3$)C=CH$_2$, 100.0 g of methanol and 0.44 g of a photoinitiator 2-methyl-1-[4-(methylthio)phenyl]-2-(4-morpholinyl)-1-propanone are mixed uniformly and react under 1,000 W ultraviolet light for 20 minutes at room temperature, and the organic solvent methanol is then vacuum-extracted to obtain a mercapto-terminated hyperbranched polymer (THHBP-b6, containing 6 mol of mercapto group per mol of THHBP-b6), having a number average molecular weight of about 2,400 g/mol.

(b) 0.01 mol (24 g) of the mercapto-terminated hyperbranched polymer THHBP-b6, 0.132 mol (15.05 g) of AGE, 60 g of dioxane and 0.6 g of a photoinitiator p-aminopropiophenone are uniformly mixed at room temperature and subjected to a thiol-olefin click reaction under 2,000 W ultraviolet light for 15 minutes at room temperature, and the organic solvent and excess AGE are then vacuum-extracted to obtain a degradable sulfur-containing hyperbranched epoxy resin having a number average molecular weight of about 3,000 g/mol, a 25° C. viscosity of 1,100 cp, an epoxy value of 0.20 mol/100 g, and a yield of 99.8%.

A curing agent 4,4-diaminodiphenylmethane is respectively uniformly mixed with each of the degradable sulfur-containing hyperbranched epoxy resins obtained in Embodiments 1-6 and a bisphenol A epoxy resin (E51, having a epoxy value of 0.51 mol/100 g) in the same way under the condition of an equimolar ratio of the hydrogen equivalent of the curing agent to the epoxy value of the hyperbranched epoxy resin, and then the mixture is cured into a film, and specifically, the mixture is first cured for 6 hours at 80-90° C., and then heated to 150-160° C. and cured for 4 hours. The pencil hardness and wear resistance of the film are tested according to the national standards GB/T6739-1996 and GB/T1768-2006, and the properties are shown in Table 1. 0.5 g of the above cured film is ground into a powder, and then degraded by 12 mL of a 0.5 mol/L aqueous phosphoric acid solution. After being stirred at 80° C. for 1.5 hours, the solution is filtered, and the filter cake is dried for 2 hours at 120° C. The degradation rate of the cured powder is then analyzed and the data is shown in Table 1.

Degradation rate (%)=(1−mass of the dried filter cake/mass of cured powder)*100%;

TABLE 1

Properties of Degradable Hyperbranched Epoxy Resin Products Prepared in Embodiments 1-6

| Resin type | Pencil hardness | Wear resistance (mg/1000 rpm) | Degradation rate (%) |
| --- | --- | --- | --- |
| Epoxy resin E51 | 4H | 17.36 | 9.2 |
| Embodiment 1 | 4H | 13.20 | 99.6 |

TABLE 1-continued

Properties of Degradable Hyperbranched Epoxy Resin Products Prepared in Embodiments 1-6

| Resin type | Pencil hardness | Wear resistance (mg/1000 rpm) | Degradation rate (%) |
|---|---|---|---|
| Embodiment 2 | 4H | 10.52 | 99.7 |
| Embodiment 3 | 4H | 12.36 | 99.5 |
| Embodiment 4 | 4H | 10.87 | 99.7 |
| Embodiment 5 | 4H | 11.34 | 99.6 |
| Embodiment 6 | 3H | 14.05 | 99.6 |

What is claimed is:

1. A degradable sulfur-containing hyperbranched epoxy resin, having structural formula:

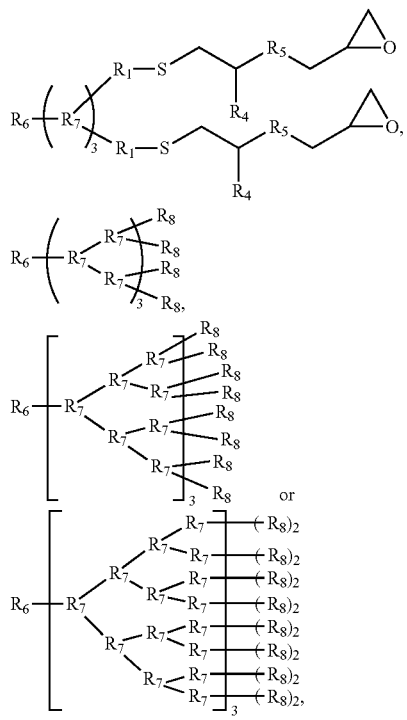

wherein $R_7$ is

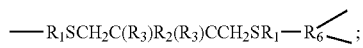

$R_8$ is

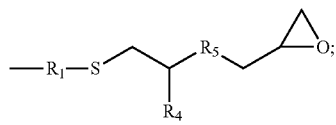

$R_1$ is —$C_6H_4(CH_2)_r$— or —$CH_2(CH_2)_k$—, r=1, 2, 3 or 4, k=2, 3, 4 or 5, and a benzene ring in the —$C_6H_4(CH_2)_r$— is para-, meta- or ortho-substituent and is an amino substituted benzene ring structure; $R_3$ is —H or —$CH_3$, and when $R_3$ is —H, $R_2$=—$CH_2O(CH_2)_mOCH_2$— or —$COO(CH_2)_mOOC$—, where m=2, 3, 4, 5 or 6; when $R_3$ is —$CH_3$, $R_2$=—$COO(CH_2)_mOOC$—, where m=2, 3, 4, 5 or 6; $R_4$ is —H or —$CH_3$, and when $R_4$ is —H, $R_5$=—$OCH_2$—; when $R_4$ is —$CH_3$, and $R_5$=—O—CO—;

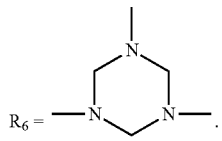

2. A preparation method of the degradable sulfur-containing hyperbranched epoxy resin according to claim 1, comprising steps of
    (a) uniformly mixing a trimercaptocyclotriazine compound B3, a diolefin compound A2, a photoinitiator and an organic solvent,
    reacting under 800-3,000 W ultraviolet light for 10-30 minutes at room temperature,
    vacuum-extracting the organic solvent to obtain a mercapto-terminated hyperbranched polymer, wherein the trimercaptocyclotriazine compound B3 is

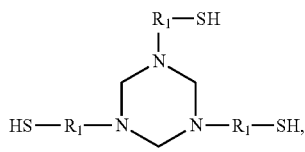

R1 is —$C_6H_4(CH_2)_r$— or —$CH_2(CH_2)_k$—, r=1, 2, 3 or 4, k=2, 3, 4 or 5, and a benzene ring in the —$C_6H_4(CH_2)r$- is para-, meta- or ortho-substituent and is an amino substituted benzene ring structure;
the diolefin compound A2 is $CH_2$=$C(R_3)R_2(R_3)C$=$CH_2$, $R_3$ is —H or —$CH_3$, and when $R_3$ is —H, $R_2$=—$CH_2O(CH_2)_mOCH_2$— or —$COO(CH_2)_mOOC$—, where m=2, 3, 4, 5 or 6; when R3 is —$CH_3$, $R_2$=—$COO(CH_2)_mOOC$—, where m=2, 3, 4, 5 or 6; and
    (b) uniformly mixing the mercapto-terminated hyperbranched polymer, an epoxy compound, a photoinitiator and an organic solvent, then carrying out a thiol-olefin click reaction under 800-3,000 W ultraviolet light for 10-30 minutes at room temperature, vacuum-extracting the organic solvent and the excess epoxy compound to obtain the degradable sulfur-containing hyperbranched epoxy resin.

3. The preparation method according to claim 2, wherein the epoxy compound in the step (b) is glycidyl methacrylate or allyl glycidyl ether.

4. The preparation method according to claim 3, wherein molar ratio of the trimercaptocyclotriazine compound B3 to the diolefin compound A2 in the step (a) is (1-1.5):1.

5. The preparation method according to claim 3, wherein molar ratio of the mercapto group in the mercapto-terminated hyperbranched polymer to the epoxy compound in the step (b) is 1:(1-2.5).

6. The preparation method according to claim 3, wherein the photoinitiator in the step (a) is one or more than two of benzophenone, p-aminopropiophenone, and 2-methyl-1-[4-(methylthio)phenyl]-2-(4-morpholinyl)-1-propanone, and the photoinitiator is used in an amount of 0.5-3% by mass of the trimercaptocyclotriazine compound.

7. The preparation method according to claim 3, wherein the photoinitiator in the step (b) is one or more than two of benzophenone, p-aminopropiophenone, and 2-methyl-1-[4-(methylthio)phenyl]-2-(4-morpholinyl)-1-propanone, and the photoinitiator is used in an amount of 0.5-3% by mass of the mercapto-terminated hyperbranched polymer.

8. The preparation method according to claim 3, wherein the organic solvent in the step (a) is one or more than two of methanol, ethanol, tetrahydrofuran, dioxane, ethyl acetate and butyl acetate, and the organic solvent is used in an amount of 0.5-3.0 times the mass of the trimercaptocyclotriazine compound.

9. The preparation method according to claim 3, wherein the organic solvent in the step (b) is one or two of methanol, ethanol, tetrahydrofuran, dioxane, ethyl acetate and butyl acetate, and the organic solvent is used in an amount of 0.5-3.0 times the mass of the mercapto-terminated hyperbranched polymer.

10. The preparation method according to claim 2, wherein the degradable sulfur-containing hyperbranched epoxy resin has a molecular weight of 3,000-35,400 g/mol.

* * * * *